United States Patent [19]
Caldwell

[11] 4,214,517
[45] Jul. 29, 1980

[54] BREAD COOKING DEVICE

[76] Inventor: Oscar D. Caldwell, 2420 SW. 32 St., Oklahoma City, Okla. 73119

[21] Appl. No.: 882,973

[22] Filed: Mar. 3, 1978

[51] Int. Cl.³ .............................................. A21B 5/02
[52] U.S. Cl. ...................................... 99/428; 99/383; 249/122; 426/138
[58] Field of Search ................ 99/428, 331, 349, 372, 99/373, 426, 427, 439, 441; 249/122, 123, 124, 125, 175; 425/DIG. 58; 426/138

[56] References Cited

U.S. PATENT DOCUMENTS

| 1,950,772 | 3/1934 | Biggs | 99/349 X |
|---|---|---|---|
| 1,974,204 | 9/1934 | Cooter | 219/407 X |
| 1,990,412 | 2/1935 | Merritt | 99/373 |
| 2,222,112 | 11/1940 | Miller | 99/428 X |
| 2,387,621 | 10/1945 | Stangle | 99/427 X |
| 2,810,338 | 10/1957 | Dawson | 249/122 |
| 2,827,847 | 3/1958 | Shafter | 99/427 X |
| 2,830,166 | 4/1958 | Loomis | 99/331 X |
| 2,899,888 | 8/1959 | Koci | 99/331 |
| 3,075,798 | 1/1963 | Smith | 99/427 X |
| 3,158,087 | 11/1964 | Hedglin | 99/428 |
| 3,341,167 | 9/1967 | Weiss | 249/122 X |
| 3,908,022 | 9/1975 | Selleck | 426/138 X |
| 3,943,840 | 3/1976 | Bolte | 99/383 X |
| 4,047,477 | 9/1977 | Berke | 99/428 |
| 4,065,581 | 12/1977 | Heiderpriem | 426/138 |

FOREIGN PATENT DOCUMENTS 600072 6/1960 Canada .................................. 426/138

Primary Examiner—Harvey C. Hornsby
Assistant Examiner—Arthur O. Henderson
Attorney, Agent, or Firm—Dunlap, Codding & McCarthy

[57] ABSTRACT

A device for cooking bread articles such as buns, wherein the bun has a cavity formed therein. The buns are cooked about a die having one member which forms a cavity in the interior of the bun and a second member which forms a slot in the bun providing access to the cavity.

10 Claims, 5 Drawing Figures

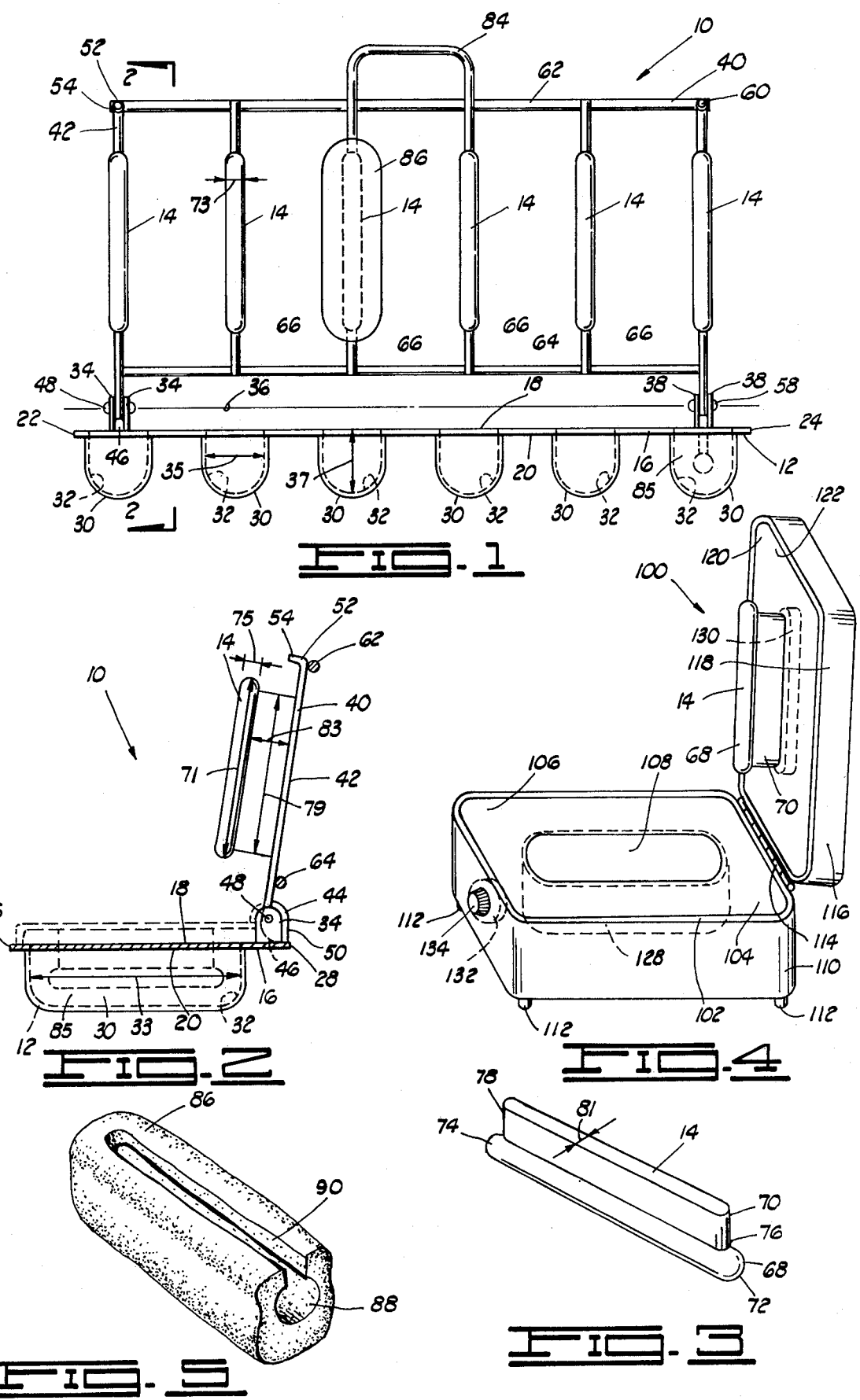

BREAD COOKING DEVICE

BACKGROUND OF THE INVENTION

1. Field of the Invention

This invention relates generally to devices for cooking bread articles and, more particularly, but not by way of limitation, to devices for cooking hot dog buns.

2. Description of the Prior Art

The use of bread articles as edible containers for other types of food is well known. A particular example is the hot dog bun in which a weiner or sausage and various condiments, such as for example, chili and/or relish, are disposed within the enlongated hot dug bun. In the past, it has been common to slit hot dog buns to permit access to their interiors so that the weiner and the condiments may be placed within the bun. It is also known to cook buns with a preformed pocket, such as the devices disclosed in U.S. Pat. No. 1,974,204, issued to Cooter on Sept. 18, 1934, and in U.S. Pat. No. 3,943,840, issued to Bolte on Mar. 16, 1976, for example.

One problem encountered with use of a bread article as a container for other foods was that the article was prone to leak fluid or semi-fluid condiments, such as for example, the chili in a hot dog. One solution to this problem was to severly limit access to the interior of the bread article or hot dog bun. However, this particular solution often interferes with the use to be made with the article. When access to the interior of the article was limited, it became difficult to achieve an even distribution of foodstuffs within the article; for example, it became difficult to evenly distribute both chili and onions in a hot dog bun having such limited access. Thus, limiting access to the interior of the bread article, while solving the problem of leakage, has heretofore introduced other problems.

SUMMARY OF THE INVENTION

The present invention takes advantage of the natural resilience of various types of bread to form a bun which may be relatively sealed during eating by pressure exerted on the bun as a result of an individual holding the bun, while providing ready access to the interior of the bun for introduction of various contents. The bun is cooked on a die having one member which forms a cavity in the bun and having a second member which forms a slot of reduced cross section extending through a portion of the bun. Various ingredients are placed in a cavity via the slot and, when the bun and its contents are subsquentially eaten the bun is squeezed to close the slot and prevent leakage.

An object of the present invention is to provide a device for forming a bread article which permits ready access to the interior of the article when various ingredients are introduced therein and substantially reduces leakage of the ingredients when the article and its contents are eaten.

Another object of the present invention is to provide a device for cooking a variety of types of bread in the form of a hollow bun which may be used for various purposes.

Other objects and advantages of the invention will be evident from the following detail description when read in conjunction with the accompanying drawings which illustrate various embodiments of the invention.

BRIEF DESCRIPTION OF THE DRAWINGS

FIG. 1 is a front elevational view of one embodiment of the bread cooking device of the present invention.

FIG. 2 is a view of the bread cooking device shown in FIG. 1, taken along line 2—2 of FIG. 1.

FIG. 3 is a perspective view of the die portion of the bread cooking device of FIGS. 1 and 2.

FIG. 4 is a perspective view of a modified bread cooking device.

FIG. 5 is a perspective, and partial cutaway, view of a bun cooked via the bread cooking device of the present invention.

DESCRIPTION OF FIGS. 1, 2, and 3

Referring to the drawings in general and to FIGS. 1 and 2 in particular, shown therein and designated by the reference numeral 10 is a bread cooking device constructed in accordance with the present invention. The bread cooking device 10 comprises a base 12 and a plurality of dies 14 which are used to form a cavity and slot in a bread article cooked in the bread cooking device 10.

The base 12 comprises a plate 16 having an upper surface 18, a lower surface 20, a first end 22, a second end 24, a front side 26 and a rear side 28. The plate 16 is formed to have a plurality of portions 30 which bulge away from the lower surface 20 to form a plurality of depressions 32, the depressions 32 being formed in the upper surface 18 with a portion of the depressions 32 intersecting the upper surface 18 of the plate 16. The depressions 32 are formed to receive breadstuff for making a bun in a manner to be described below and the depressions 32 have been indicated by dashed-lines in FIGS. 1 and 2. Each depression 32 has a length 33 (shown in FIG. 2) a width 35 (shown in FIG. 1) and a depth 37 (shown in FIG. 1). (For clarity of illustration, the width 35 and the depth 37 have each been shown for only one depression 32 in FIG. 1.)

Generally, adjacent the first end 22 of the plate 16 a pair of spaced apart flanges 34 are formed on the upper surface 18 of the plate 16, the flanges 34 extending substantially perpendicularly to the upper surface 18. Holes (not shown) are drilled through the flanges 34 along a line substantially parallel to the rear side 28 of the plate 16 to form a pivotation axis 36 which is substantially parallel to the upper surface 18 of the plate 16. A second pair of flanges 38 are similarly disposed adjacent the rear side 28 of the plate 16 near the second end thereof. Holes (not shown) are drilled through the flanges 38 along a line coincident with the pivotation axis 36.

The die support 40 is pivotally mounted on the base 12 via the holes (not shown) in the flanges 34 and 38. The die support 40 comprises a first leg 42 shaped in the form of a rod and having an enlarged portion 44 formed at one end 46 thereof (the enlarged portion 44 is shown partially in dashed-lines in FIG. 2). A hole (not shown) is drilled through the enlarged portion 44 for pivotally mounting the first leg 42 on the base 12 for pivotation of the first leg 42 about the pivotation axis 36. The enlarged portion 44 is placed between the flanges 34 and a fastener 48 such as, for example, a rivet is passed through the holes (not shown) in the flanges 34 and the enlarged portion 44. A projection 50 is formed on the enlarged portion 44 and a right angle bend is formed near a second end 52 of the first leg 42 to integrally form a stud 54 on the first leg 42 near the second end 52 thereof. The purposes of the projection 50 and of the stud 54 will be discussed in greater detail below.

A second leg 56, substantially identical to the first leg 42, is pivotally mounted on the base 16 via the flanges 38 and a fastener 58, in the same manner that the first leg 42 is mounted on the base 16. The second leg 56 is provided with a stud 60, corresponding to the stud 54 of the first leg 42, and the second leg 56 is pivotable about the axis of pivotation 36 in a plane spaced a distance from the plane of pivotation of the first leg 42.

The die support 40 further comprises a first cross member 62 connected to the first leg 42 near the stud 54 and to the second leg 56 near the stud 60, the first cross member 62 extending between the legs 42 and 56. A second cross member 64 extends substantially parallel to the first cross member 62 and is connected to the first leg 42 and to the second leg 56 generally near the pivotation axis 36. The cross members 62 and 64 cooperate to maintain a substantially parallel relationship between the first leg 42 and the second leg 56 such that the die support 40 is formed into a substantially rigid structure which is pivotable about the pivotation axis 36.

A plurality of die mounting rods 66 are connected to the first cross member 62 and to the second cross member 64, the die mounting rods 66 each extending between the cross members 62 and 64. The die mounting rods 66 are disposed substantially parallel to the legs 42 and 56 and are spaced along the cross members 62 and 64 such that each die mounting rod 66 is aligned with one of the depressions 32 in the base 12. That is, a pivotation of the die support 40 about the axis of pivotation 36 will move each of the die mounting rods in an arc which intersects the central portion of a depression 32. Similarly, the flanges 34 and 38 are positioned on the base 12 such that a pivotation of the die support 40 about the pivotation axis 36 will move the legs 42 and 56 along arcs which intersect central portions of depressions 32 formed in the base 12. The dies 14 are mounted on the legs 42, 56 and on the die mounting rods 66 such that the die support 40 may be moved to a first position, indicated in broken lines in FIG. 2, wherein each die 14 will extend into one of the depressions 32 in the base 12. The configuration of the bread cooking device 10 when the die support 40 is in the first position will be sometimes referred to herein as a cooking position of the bread cooking device 10. The die support 40 is pivotable to a second position, illustrated in solid-line in FIGS. 1 and 2, wherein the legs 42 and 56 and the die mounting rods 66 are disposed at a substantial angle with respect to the upper surface 18 of the base 12 and wherein the dies 14 are removed from the depressions 32. As used herein, the term substantial angle denotes an angle resulting from a pivotation of greater than 90° from a parallel configuration with the upper surface 18 of the base 12. The configuration of the bread cooking device 10 when the die support 40 is in the second position will be sometimes referred to herein as an open position of the bread cooking device 10.

As shown more clearly in FIG. 3, each die 14 comprises a cavity forming member 68 and a slot forming member 70. Each cavity forming member 68 is positionable within a portion of one of the depressions 32 formed in the base 12 in the cooking position of the bread cooking device 10, and each cavity forming member 68 has rounded opposite ends 72 and 74, each cavity forming member 68 being generally cylindrically shaped. Each cavity forming member 68 has a length 71 (shown in FIG. 2) which extends generally between the opposite ends 72 and 74, a width 73 (shown in FIG. 1) which extends generally transverse with respect to the length and a depth 75 (shown in FIG. 2). The length 71 of each cavity forming member 68 is less than the length 33 of the depressions 32 and the length of each cavity forming member 68 expends generally parallel with the length 33 of one of the depressions 32 in the cooking position of the bread cooking device 10. The width 73 of each cavity forming member 68 is less than the width 35 of the depressions 32 and the width 73 of each cavity forming member 68 extends generally parallel with respect to the width 35 of one of the depressions 32 in the cooking position of the bread cooking device 10. The depth 75 of each of the cavity forming members 68 is less than the depth 37 of the depressions 32 and the depth 75 of each of the cavity forming members 68 extends generally parallel with respect to one of the depressions 32 in the cooking position of the bread cooking device 10.

Each slot forming member 70 is generally rectangularly or bar shaped and each slot forming member 70 is connected to one of the cavity forming members 68, each slot forming member 70 extending a distance from the cavity forming member 68 connected thereto. Each slot forming member 70 has opposite ends 76 and 78, a length 79 (shown in FIG. 2) which extends generally between the opposite ends 76 and 78, a width 81 (shown in FIG. 3) which extends generally transverse with respect to the length 79 and a depth 83 (shown in FIG. 2). The length 79 of each slot forming member 70 extends generally parallel with respect to the length 71 of the cavity forming member 68 connected thereto and, in one embodiment, the length 79 of each slot forming 70 is less than the length 71 of the cavity forming member 68 connected thereto. The width 81 of each slot forming member 70 is less than the width 73 of the cavity forming member 68 connected thereto and the width 81 of each slot forming member 70 extends generally parallel with respect to the width 73 of the cavity forming member 78 connected thereto. The depth 83 of each slot forming member 70 extends generally parallel with respect to the depth 75 of the cavity forming member 68 connected thereto and, in one embodiment, the depth 83 of each slot forming member 70 is less than the depth 75 of the cavity forming member 68 connected thereto. Each slot forming member 70 is attached to one of the cavity forming members 68, for example by welding. The ends 76 and 78 of each of the slot forming members 70, generally adjacent to the ends 72 and 74, respectively, of the cavity forming member 68 connected thereto, can be rounded as shown in FIG. 3.

The die support 40 is constructed to support the cavity forming members 68 and the slot forming members 70 in a predetermined position wherein each of the cavity forming members 68 and the slot forming member 70 connected thereto is disposed within a portion of one of the depressions 32 formed in the base 12 in the cooking position of the bread cooking device 10. A portion of each of the slot forming members 70 is connected to the die support 40 and each slot forming member 70 extends a distance from the die support 40. Each cavity forming member 68 is connected to a portion of one of the slot forming members 70, generally opposite the portion of the slot forming member 70 which is connected to the die support 40. The die support 40 positions each of the cavity forming members 68 within a portion of one of the depressions 32 such that each cavity forming member 68 is spaced a distance from the portions of the base 12 formed via the depression 32 in the cooking position of the bread cooking device 10 and the die support 40 positions each of the slot forming members 70 within one of the depressions 32 with each slot forming member 70 being spaced a distance from the portions of the base formed via the depressions 32 in the cooking position of the bread cooking device 10, i.e. the die support 40 positions each of the cavity forming members 68 and the slot forming member 70 connected thereto within one of the depressions 32 such that a space 85 exists between the portions of the base 12 formed via each of the depressions 32 and the cavity forming member 68 and the slot forming member 70 disposed in such depression 32 in the cooking portion of the bread cooking device 10. The depressions 32, the cavity forming members 68 and the slot forming members 70 are sized such that each of the spaces 85 is sufficiently large to accomodate the breadstuff.

In the open position of the bread cooking device 10, the projection 50 on the first leg 42 and a similar projection (not shown) on the second leg 56 engage the upper surface 18 of the base 12 to maintain the die support 40 in the second position thereof. In the second position of the die support 40, the die support 40 is disposed at a substantial angle to the base 12 such that bread articles cooked in the bread cooking device 10 are readily accessible as illustrated in FIG. 1. When the bread cooking device 10 is placed in the cooking position, the studs 54 and 60 formed on the legs 42 and 56 respectively engage the upper surface 18 of the base 12 to maintain the die support 40 in the first position thereof. For this purpose, the lengths of the studs 54 and 60 are substantially equal to the height of the pivotation axis 36 above the upper surface 18 so that, in the cooking position of the bread cooking device 10, the lengths 71 and 79 of the cavity forming member 68 and slot forming member 70 of each die 14 is generally parallel to the length 33 of the cavity 32 in which the die 14 is disposed.

For the purpose of moving the die support 40 between the first and second positions thereof, the die support 40 can be provided with a handle 84. In particular, it is convenient to form the handle 84 unitarily with two of the die mounting rods 66 as illustrated in FIG. 1. That is, a length of rod is bent into the shape of an enlongated U and attached to the cross members 62 and 64 to form the handle 84 and two of the die mounting rods 66.

Operation of FIGS. 1 and 2

It will be clear to those skilled in the art that a bread article may be cooked from various types of dough or batter. In particular, the article may be formed from a batter similar to pancake batter or from a yeast rising dough, such as is commonly used in making rolls and the like, or a self-rising dough such as that commonly used for making biscuits. The term breadstuff will be used herein as a generic term applying to any type batter or dough suitable for making a bread article.

While the present invention is not limited to any particular type of breadstuff, its use may vary according to the nature of the breadstuff. Without implying any limitation to the application of the bread cooking device 10, the use thereof will now be described for a batter, a yeast rising dough, and a self-rising dough.

With a batter, it is convenient to place the bread cooking device 10 in the cooking position wherein the dies 14 extend into the depressions 32. A quantity of batter may then be poured into the spaces 85 about the dies 14 such that the batter substantially covers the cavity forming member 68 of each die 14. The batter may then be cooked by placing the bread cooking device 10 in an oven at a suitable temperature and for a length of time appropriate for the batter. If a self-rising dough, such as biscuit dough, is used to form a bun, the dough may be cut into strips which are placed in the depressions 32 while the bread cooking device 10 is in the open position and the die support 40 may then be moved to the first position thereof. The dough may then be baked in an oven in a manner similar to the manner in which a batter would be cooked. In either case, the batter or the self-rising dough will rise around the slot forming member 70. Thus, the cooked bread article will have the general shape of the bun 86 shown in FIGS. 1 and 5. The bun will have a central elongated cavity 88 corresponding in shape to the cavity forming member 68 of the dies 14 and a slot 90 will extend from the cavity 88 to the surface of the bun 86. The cavity 88 will terminate within the interior of the bun 86 and the slot 90 will extend along one surface of the bun 86 and terminate a distance from each end of the bun 86.

A similar bun is formed with yeast rising dough as will now be described. With yeast rising dough it is convenient to place strips of dough within the depressions 32 while the die support 40 is in the second position in the same manner that self-rising dough is placed within the depressions 32 while the die support 40 is in the second position thereof. The die support 40 is then moved to the first position thereof such that the bread cooking device 10 is in the cooking position. With the bread cooking device 10 in the cooking position, the yeast-rising dough can be allowed to rise in the usual manner of such doughs such that the dough rises about the slot forming member 70. When the dough is subsequently baked, a bun having the shape of the bun 86 in FIG. 5 will be formed.

After the breadstuff has been cooked, the die support 40 is moved to the second position illustrated in solid lines in FIGS. 1 and 2, to remove the buns 86 from the depressions 32. The buns 86 will be disposed on the dies 14 as has been illustrated for one bun 86 in FIG. 1 and the natural resiliency of various breads permits the buns 86 to be removed from the dies 14 as needed.

The buns 86 are used by introducing selected ingredients through the slot 90 and distributing such ingredients along the cavity 86 via the access to the interior provided by the slot 90. When a bun 86 and its contents are subsequently eaten, pressure by the fingers along the side of the bun 86 can be used to close the slot 90 to prevent leakage of the contents of the bun 86.

Description of FIG. 4

A second embodiment of the bread cooking device of the present invention is illustrated in FIG. 4 and designated by the numeral 100 therein. The bread cooking device comprises a base 102 and a die 14 which is substantially identical to the dies 14 in the bread cooking device 10.

The base 102 comprises a plate 106 having an upper surface 104 and having a depression 108 formed in the upper surface 104 in the manner that the depressions 32 are formed in the upper surface 18 of the plate 16 in the bread cooking device 10. The depression 108 has a length, a width and a depth defined in the same manner that the length 33, width 35 and depth 37 of the depressions 32 are defined. (For clarity of illustration, the length, width and depth of the depression 108 have not been illustrated in FIG. 4.)

The base 102 further includes a casing 110 to which the plate 106 may be attached in any convenient manner. Supports 112 can be conveniently attached to the casing 110 to support the base 102 on a table top or the like. A hinge 114 is disposed along one side of the casing 110 to permit a die support 116 to be pivotally mounted on the base 102. The die support 116 comprises a casing 118 which is attached to the hinge 114. A plate 120 is supported by the casing 118 in any convenient manner such as, for example, by means of screws (not shown). The plate 120 has an outer face 122 which may be pivoted into contact with the upper surface 104 of the base 102 and the die 14 is mounted on the face 122. The configuration of the bread cooking device 100 when the outer face 122 is in contact with the upper surface 104 will be sometimes referred to herein as a cooking position of the bread cooking device 100 and the position of the die support 116 when the bread cooking device 100 is in the cooking position will be sometimes referred to herein as the first position of the die support 116.

The die 14 is mounted on the outer face 122 such that, when the bread cooking device 100 is in the cooking position, the die 14 is aligned in the depression 108 in the same manner that the dies 14 of the bread cooking device 10 are aligned with the depressions 32 when the bread cooking device 10 is in the cooking position thereof. In particular, the lengths, widths, and depths of the cavity forming member 68 and slot forming member 70 of the die 14 are generally parallel with the length, width and depth of the cavity 108 when the bread cooking device 100 is in the cooking position thereof (as is the case with the depression 108, the lengths, widths and depths of the die 14 have not been illustrated in FIG. 4 for clarity of illustration).

The bread cooking device 100 includes a base heating coil 128 which is disposed about portions of the base 102 forming the depression 108. A die heating coil 130 is disposed within the die support 116 and is generally positioned on portions of the plate 120 upon which the die 14 is mounted. Heating coils suitable for use in the bread cooking device 100 are well known in the art and need not be further discussed herein. A temperature control mechanism, generally designated 132 is mounted within the base 102 and may be adjusted via a control knob 134. Numerous types of temperature control devices suitable for use with the present invention are known in the art so that a detailed description of a temperature control mechanism 132 is not required herein. It suffices to note that power is supplied to the temperature control mechanism 132 via electrical conductors (not shown) and an electrical connector (not shown) which may be connected to an electrical receptacle of the type usually found in the household. Wiring (not shown) connects the heating coils 128 and 130 to the temperature control mechanism 132 in the usual manner such that the heat output of heating coils 128 and 130 may be varied by adjusting the quantity of electric power delivered thereto by the temperature control mechanism 132. The operation of the bread cooking device 100 differs from the operation of the bread cooking device 10 only in that electrical power is used to cook the breadstuff and in that batter or dough is introduced into the depression 108 while the die support 116 is in the position illustrated in FIG. 4 and corresponding to the second position of the die support 40 in the bread cooking device 10. Once dough or batter has been introduced into the depression 108, the bread cooking device 100 may be placed in the cooking position by pivoting the die support 116 about the hinge 114 to bring the die support 116 to the first position (not shown) corresponding to the first position of the die support 40 wherein the die 124 is disposed within the batter or dough within the depression 108.

It is clear that the present invention is well adapted to carry out the objects and attain the ends and advantages mentioned as well as those inherent therein. Changes may be made in the construction and arrangement of the parts or the elements of the various embodiments as disclosed herein without departing from the spirit and scope of the invention as defined in the following claims.

What is claimed is:

1. A bread cooking device for making a bun from breadstuff, comprising:

a base having an upper surface and a depression formed in the upper surface for receiving breadstuff, a portion of the depression intersecting the upper surface of the base and the depression having a length, a width and a depth; and a die having a portion positionable within a portion of the depression formed in the base in a cooking position of the bread cooking device, the die comprising:

a cavity forming member positionable within a portion of the depression formed in the base in the cooking position of the bread cooking device, the cavity forming member having opposite ends, a length extending generally between the opposite ends, a width extending generally transverse with respect to the length and a depth, the length of the cavity forming member being less than the length of the depression formed in the base and the length of the cavity forming member extending generally parallel with respect to the length of the depression in the cooking position of the bread cooking device, the width of the cavity forming member being less than the width of the depression formed in the base and the width of the cavity forming member extending generally parallel with respect to the width of the depression formed in the base in the cooking position of the bread cooking device, the depth of the cavity forming member being less than the depth of the depression formed in the base and the depth of the cavity forming member extending generally parallel with respect to the depth of the depression formed in the base in the cooking position of the bread cooking device;

a slot forming member connected to the cavity forming member and extending a distance therefrom and being positionable within a portion of the depression formed in the base in the cooking position of the bread cooking device, the slot forming member having opposite ends, a length extending generally between the opposite ends, a width extending generally transverse with respect to the length and a depth, the length of the slot forming member being less than the length of the depression formed in the base and the length of the slot forming member extending generally parallel with respect to the length of the cavity forming member, the width of the slot forming member being less than the width of the cavity forming member extending generally parallel with respect to the width of the cavity forming member, the depth of the slot forming member extending generally parallel with respect to the depth of the cavity forming member; and a die support for supporting the cavity forming member and the slot forming member in a predetermined position disposed within a portion of the depression formed in the base in the cooking position, a portion of the slot forming member being connected to the die support and extending a distance from the die support and the cavity forming member being connected to a portion of the slot forming member generally opposite the portion of the slot forming member connected to the die support, the die support positioning the cavity forming member within a portion of the depression formed in the base with the cavity forming member being spaced a distance from the portion of the base formed via the depression in the base and with the slot forming member being spaced a distance from the portions of the base formed via the depression in the base, the breadstuff being disposable within the space between the cavity forming member and the portions of the base formed via the depression in the base and within the space between the slot forming member and the portions of the base formed via the depression in the base in the cooking position of the bread cooking device for forming a bun with a cavity formed via the cavity forming member in a generally central portion of the bun and with a slot formed via the slot forming member extending through a portion of the bun, the slot in the bun intersecting a portion of the bun and extending a distance through a portion of the bun and intersecting a portion of the cavity in the bun, thereby forming a bun with closed ends wherein each closed end extends a distance along one surface of the bun toward the slot formed by the slot forming member.

2. The bread cooking device of claim 1 wherein the length of the slot forming member is defined further as being less than the length of the cavity forming member and wherein one end of the slot forming member is spaced a distance from one end of the cavity forming member and the opposite end of the slot forming member is spaced a distance from the opposite end of the cavity forming member.

3. The bread cooking device of claim 2 wherein the width of the slot forming member is defined further as extending between opposite sides of the slot forming member, and wherein the width of the cavity forming member is defined further as extending generally between opposite sides of the cavity forming member, and wherein one side of the slot forming member is spaced a distance from one side of the cavity forming member and the opposite side of the slot forming member is spaced a distance from the opposite side of the cavity forming member.

4. The bread cooking device of claim 3 wherein the cavity forming member is defined further as having a generally circularly shaped cross section, the cavity forming member being generally cylindrically shaped.

5. The bread cooking device of claim 4 wherein the slot forming member is defined further as being generally rectangularly shaped.

6. The bread cooking device of claim 4 wherein the bun is generally hot dog bun shaped for accommodating a weiner like meat product and garnish materials, and wherein the cavity in the bun formed via the cavity forming member is defined further as being sized to accommodate the weiner like meat product and a portion of the garnish materials, and wherein the slot in the bun formed via the slot forming member is defined further as having a width less than the diameter of the weiner like meat product so the portions of the bun formed via the slot in the bun cooperate to retain the weiner like meat product and a portion of the garnish materials within the cavity in the bun.

7. The bread cooking device of claim 1 wherein the die support is defined further as having an outer face, the slot forming member being connected to the outer face of the die support and a portion of the outer face of the die support engaging a portion of the upper surface of the base in the cooking position of the bread cooking device the outer surface of the die support cooperating to retain the breadstuff generally within the spaces between the cavity forming member, the slot forming member and the portions of the base formed via the depression in the base in the cooking position of the bread cooking device.

8. The bread cooking device of claim 1 wherein the die support is defined further as being pivotally connected to the base, the die support being pivotable to a first position wherein the bread cooking device is in the cooking position and pivotable to a second position wherein the cavity forming die and slot forming die are each removed from the depression, the breadstuff being disposable within the depression in the base and the bun being removable from the depression in the base in the second position of the die support.

9. The bread cooking device of claim 1 wherein the base is defined further to include a plurality of depressions, each of the depressions being formed in the upper surface of the base, and wherein the die is defined further to include a plurality of cavity forming members and a plurality of slot forming members, one of the cavity forming members and one of the slot forming members being disposable within each of the depressions in the base in the cooking position of the bread cooking device.

10. The bread cooking device of claim 9 wherein the die support is defined further to include:
a first leg pivotally connected to the base and pivotable about a pivotation axis substantially parallel to the upper surface of the base, the first leg supporting one of the dies;
a second leg pivotally connected to the base and pivotable about the pivotation axis of the first leg, the second leg spaced a distance from the first leg along the pivotation axis of the first leg and a second leg supporting one of the dies;
a first cross member connected to the first leg and to the second leg and extending therebetween;
a second cross member connected to the first leg and to the second leg and extending therebetween substantially parallel to the first cross member, the second cross member cooperating with the first cross member to maintain the first leg and the second leg in a substantially parallel relation; and
a plurality of die mounting rods, each of the die mounting rods being connected to the first cross member and to the second cross member and extending therebetween substantially parallel to the first leg and the second leg, each die mounting rod supporting one of the dies.

* * * * *